Figure 1:
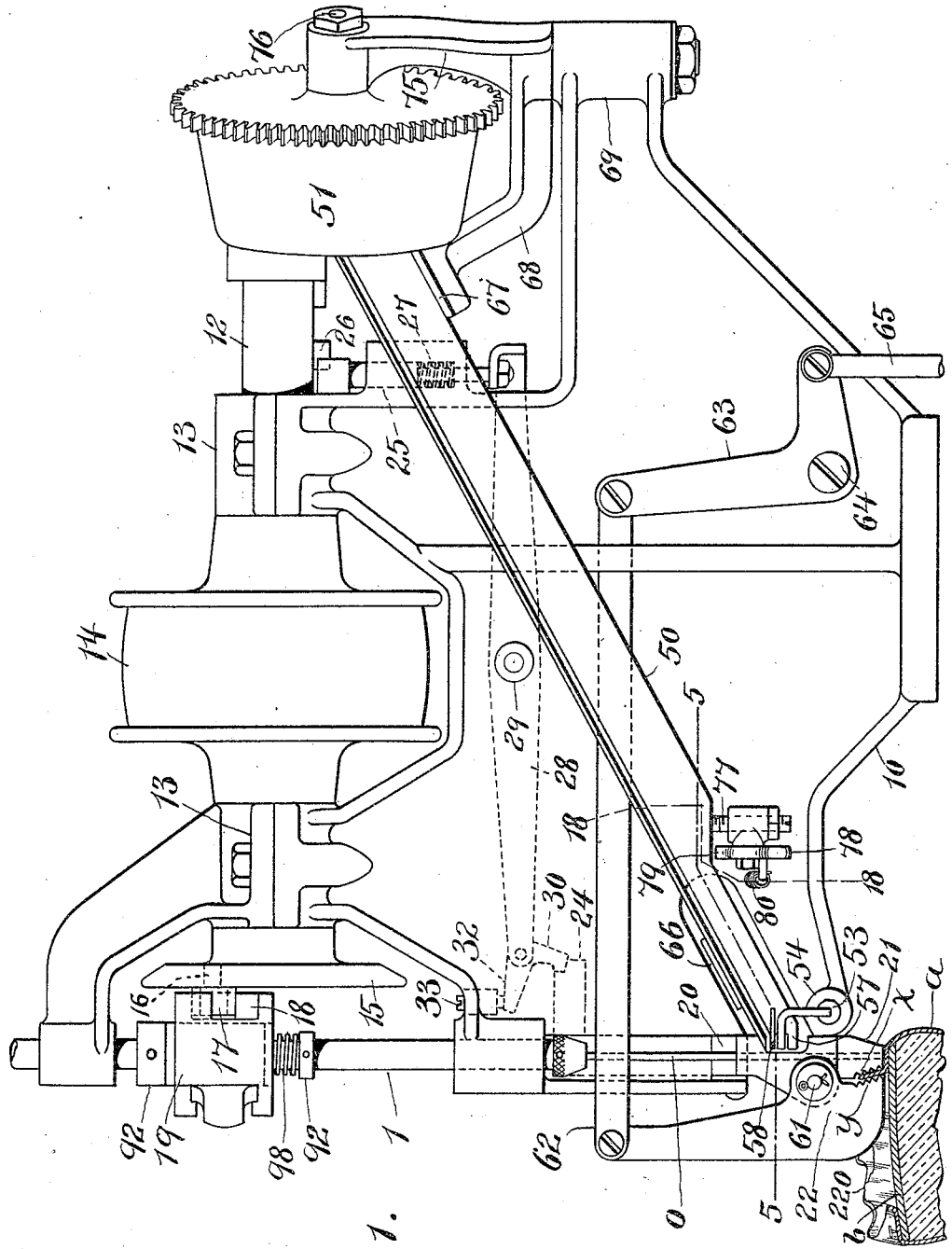

H. A. BALLARD.
MACHINE FOR INSERTING FASTENERS IN SHOES.
APPLICATION FILED AUG. 30, 1905. RENEWED JUNE 4, 1912.

1,050,906.

Patented Jan. 21, 1913.
5 SHEETS—SHEET 1.

Witnesses:
C. C. Stecher
L. E. Kennedy

Inventor:
H. A. Ballard
by Wright Brown Quimby & May
Attorneys.

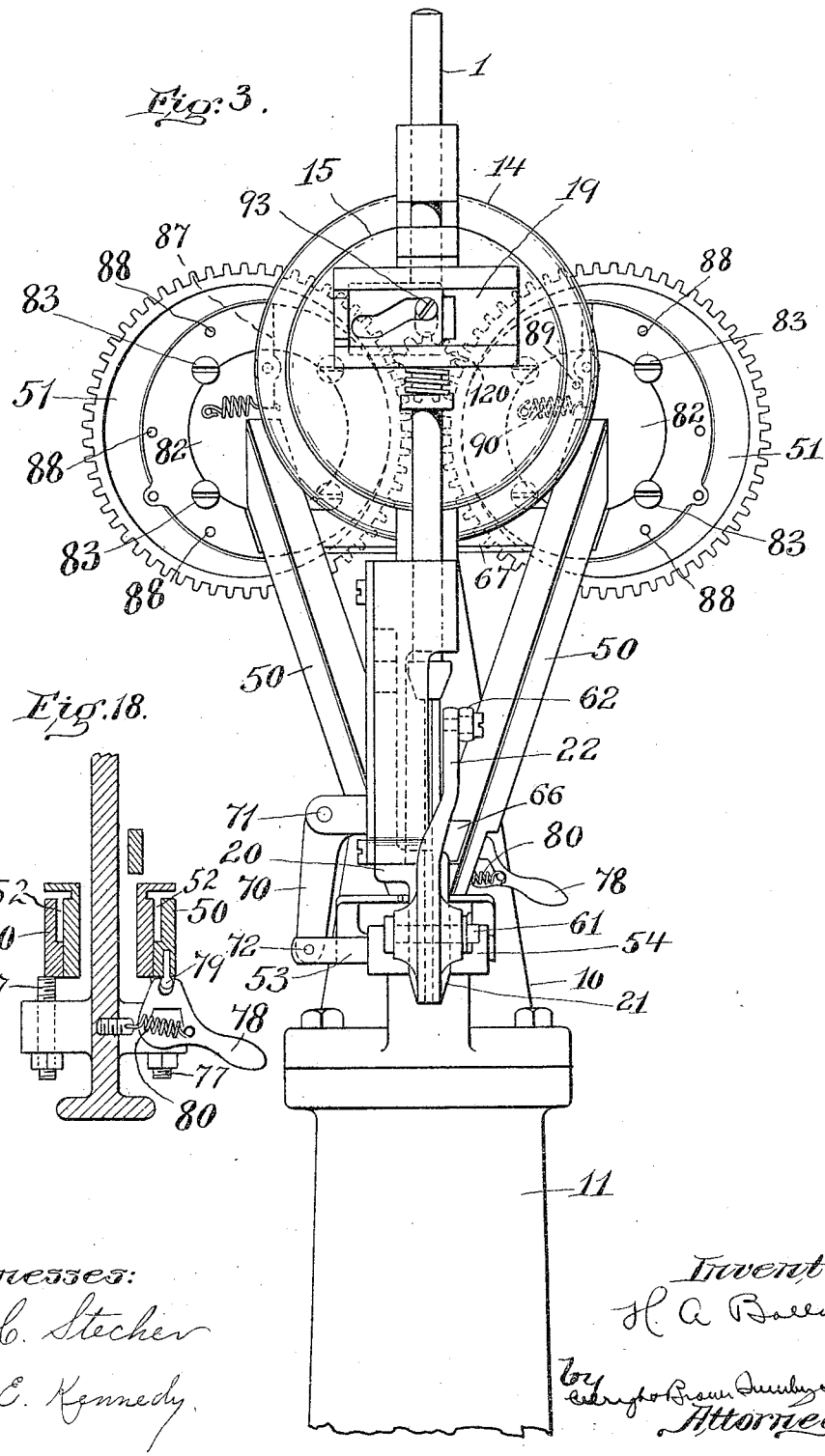

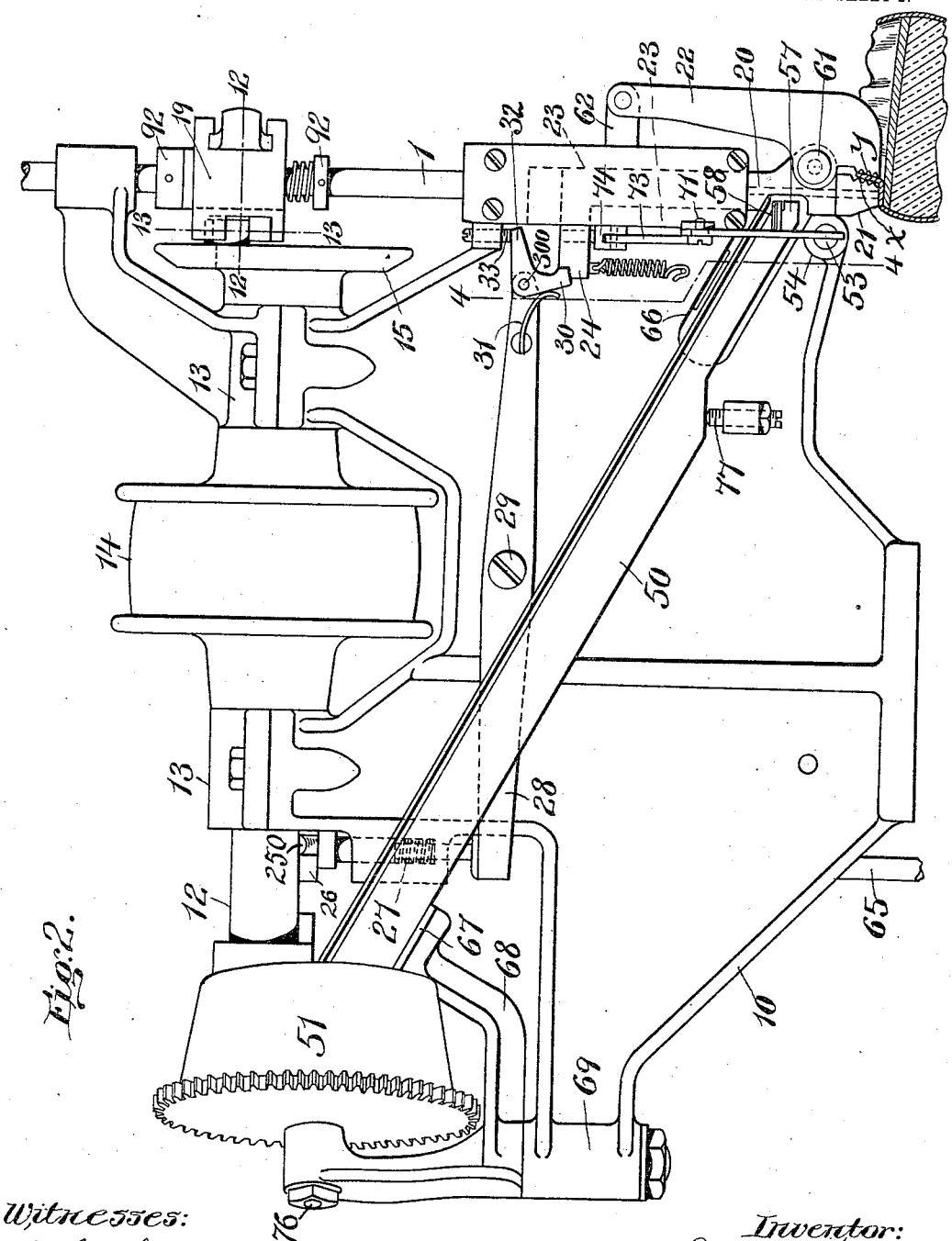

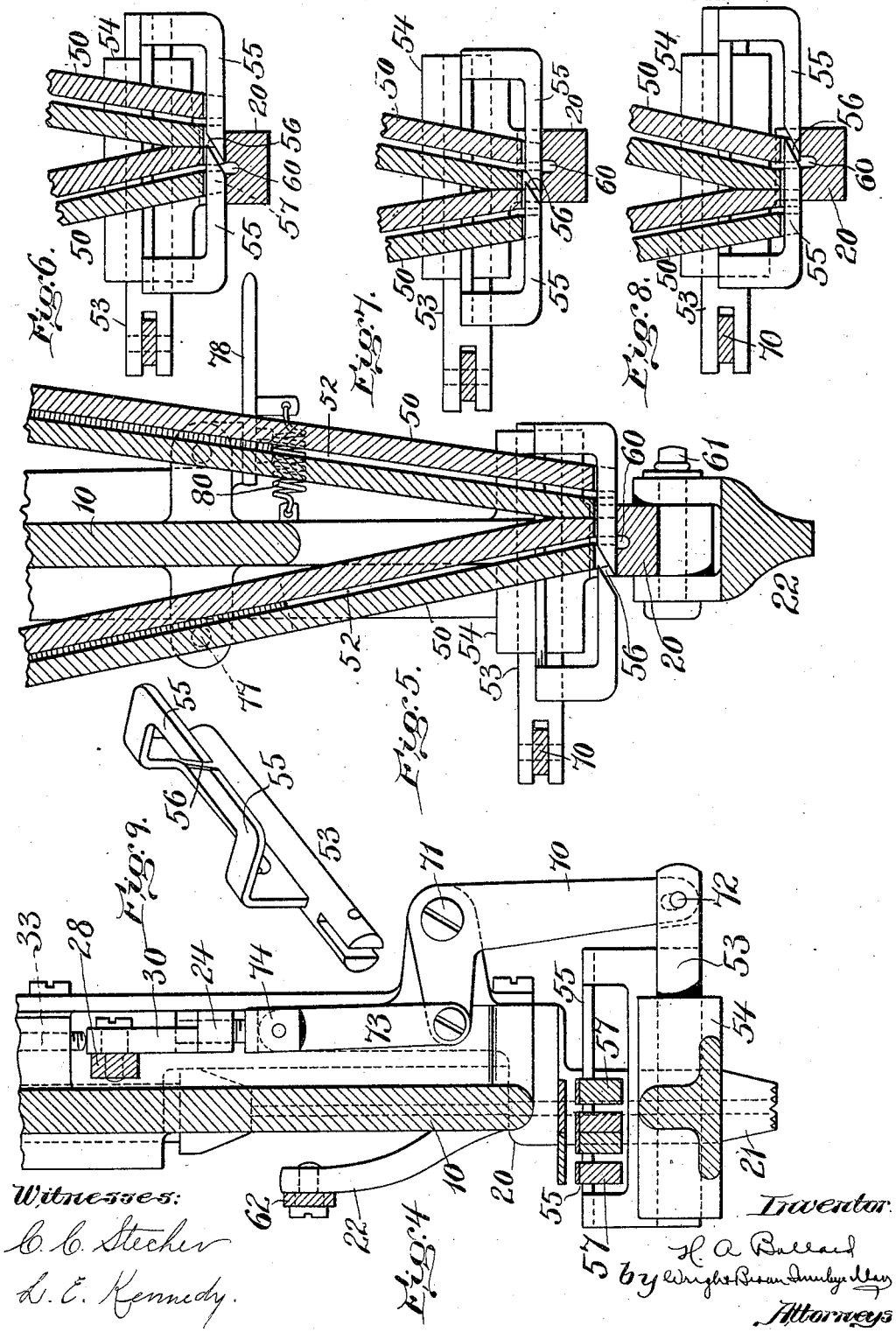

H. A. BALLARD.
MACHINE FOR INSERTING FASTENERS IN SHOES.
APPLICATION FILED AUG. 30, 1905. RENEWED JUNE 4, 1912.
1,050,906.
Patented Jan. 21, 1913.
5 SHEETS—SHEET 5.
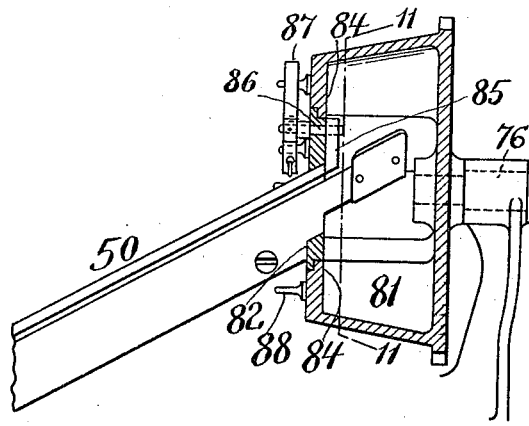
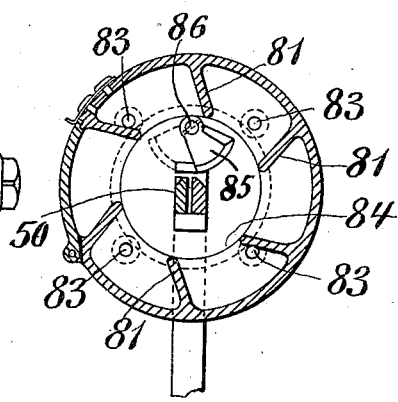
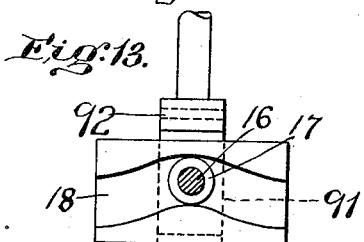
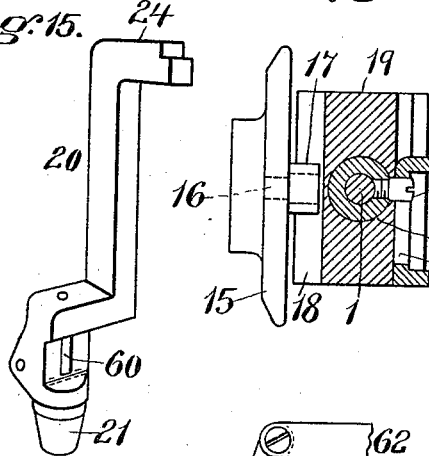
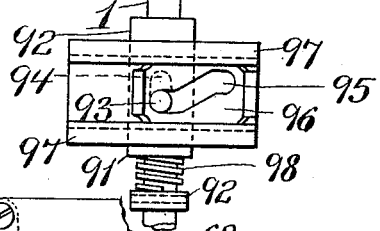
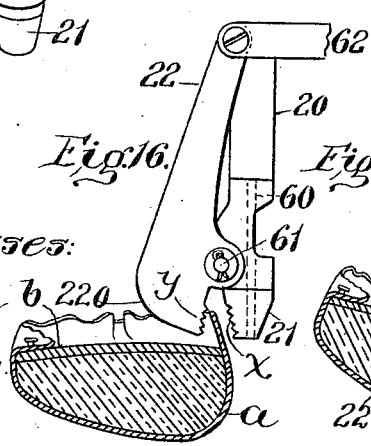
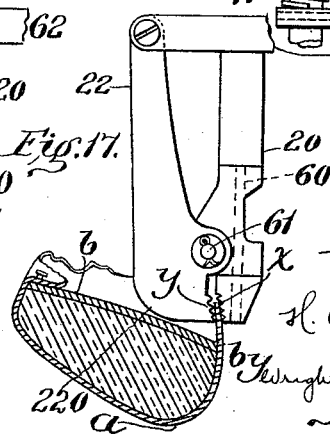
Witnesses:
C. C. Stecher
L. E. Kennedy
Inventor:
H. A. Ballard
by Wright Brown Quinby & May
Attorneys.

UNITED STATES PATENT OFFICE.

HARRIE A. BALLARD, OF ASHLAND, MASSACHUSETTS, ASSIGNOR TO THE BOYLSTON MANUFACTURING COMPANY, OF BOSTON, MASSACHUSETTS, A CORPORATION OF NEW JERSEY.

MACHINE FOR INSERTING FASTENERS IN SHOES.

1,050,906.  Specification of Letters Patent.  Patented Jan. 21, 1913.

Original application filed January 28, 1904, Serial No. 190,932. Divided and this application filed August 30, 1905, Serial No. 276,398. Renewed June 4, 1912. Serial No. 701,659.

*To all whom it may concern:*

Be it known that I, HARRIE A. BALLARD, of Ashland, in the county of Norfolk and State of Massachusetts, have invented certain new and useful Improvements in Machines for Inserting Fasteners in Shoes, of which the following is a specification.

This invention has for its object to provide a fastener-inserting machine for employment in connection with boots and shoes, and consists of certain novel features of construction and arrangement of parts, as illustrated upon the accompanying drawings, described in the following specification, and particularly pointed out in the claims.

The invention may be conveniently embodied in a machine for driving tacks, in which the operation of the tack-feeding and driving mechanism is controlled by a gripper which may be employed for gripping the upper during the manipulation of the shoe, to draw the upper taut about the last, or to position it relatively thereto.

Reference is to be had to the accompanying drawings, forming a part of this specification, of which,—

Figure 1 represents in side elevation a tacking-machine embodying the several features of this invention, and a portion of a shoe in process of lasting. Fig. 2 represents an elevation of the opposite side of the machine. Fig. 3 represents a front elevation, with the shoe omitted. Fig. 4 represents a vertical section on line 4—4 of Fig. 2, showing the tack-feeding mechanism. Fig. 5 represents a sectional plan view of the tack-races and tack-feeder. In this view, the left-hand tack-race is in position to deliver tacks to the tack-feeder which is at its starting position. Fig. 6 represents a view similar to that shown in Fig. 5, except that the tack-feeder is shown at the extreme of its feeding-stroke, after having fed a tack. Fig. 7 shows the other tack-race in position to deliver tacks to the feeder, which is in the position shown in Fig. 5. Fig. 8 shows the tack-feeder at the extreme of its feeding stroke, as in Fig. 6. Fig. 9 is a perspective view of the tack-feeder which transfers the tacks one at a time from either of the tack-races to the nipple-bar. Fig. 10 is a vertical section of one of the tack-reservoirs. Fig. 11 is a section on line 11—11 of Fig. 10. Fig. 12 is a section on line 12—12 of Fig. 2. Fig. 13 is a section on line 13—13 of Fig. 2. Fig. 14 shows the driver-bar in a lowered position in relation to that shown in Fig. 3. Fig. 15 is a perspective view of the nipple-bar and nipple. Figs. 16 and 17 show the method of pulling the upper over the inner-sole of the shoe before the tack is driven. Fig. 18 is a section on the line 18—18 of Fig. 1.

On the drawings,—10 represents the head or frame of the machine, which is mounted on a suitable standard, the upper portion of which is shown at 11, in Fig. 3. The tack-driver is indicated at o as attached to the lower end of a driver-bar 1. The said driver receives its motion from a shaft 12, journaled in bearings 13 13 in the head 10. The shaft 12 is rotated by a continuously-driven clutch-pulley of suitable construction, shown at 14 as mounted on said shaft. On the end of the shaft 12, adjacent the driver-bar, is affixed a crank-disk 15 provided with a crank-pin 16. A roller 17 on the crank-pin 16 travels in a slot 18 in the driver-block 19, to which the driver-bar is attached. By virtue of this construction and arrangement, the rotation of the shaft 12 effects the vertical reciprocation of the driver-bar 1. As hereinafter described, provision is made whereby the range of reciprocation of the driver-bar 1 may be varied.

The nipple-bar 20, to the lower end of which is attached the tack-delivering nipple 21 and the gripping-lever 22, is adapted to slide in guides 23 23 in the head 10. A backwardly-projecting extension 24 of said nipple-bar engages the mechanism which causes the pulley 14 to clutch and drive the shaft 12 and automatically release and stop said shaft at the end of one complete revolution. Said mechanism comprises a plunger 25, which is mounted in a boss on the head 10. The upper end of said plunger is provided with a beveled face 250, which engages a projection 26 on the shaft 12. Said projection extends through the shaft to the clutch contained in the pulley 14. The clutch may be of any suitable construction which need not be specifically described. The plunger 25 is normally held upward by a spring 27, and its lower end is connected to a trippinglever 28. Said lever extends forwardly to the nipple-bar 20 and is fulcrumed at 29 to the head 10. A latch 30 pivoted at 300 to the forward end of the lever 28 rests on the extension 24 of the nipple-bar 20, and is held against said extension by a spring 31. A finger 32 on the latch 30 engages an adjustable stop 33, in such manner that when said latch is raised by the extension 24, it raises the forward end of the lever 28 and is caused to oscillate on its pivot 300 until it has ridden off the end of said extension. In consequence of the freeing of the latch 30 from the extension 24, said latch is not affected by any further upward movement of said extension, and the lever 28 is free to be returned to its former position by the spring 27. Not until the extension 24 has dropped to its former position does the latch 30 spring into place on said extension.

50 50 indicate the two inclined tack-races which receive the tacks from tack-reservoirs 51 51, one containing long and the other short tacks. Said races converge toward each other near the driver o, but their slots 52 52 do not quite meet. At the lower end of the races 50 is the tack-feeder 53 (Fig. 9) mounted in a boss 54 on the head 10, and adapted to slide back and forth across the path of the tacks. Said feeder is provided with two fingers 55 55, which flank the outer sides of the races 50 and project toward each other across the end of said races. The fingers 55 are complementally beveled to form a diagonal slot 56. The tacks, by reason of gravity, slide toward the feeder 53 but are retained in the races by the inner faces of the fingers 55 which lie in the path of the shanks of the tacks. A transverse motion of the feeder 53 causes the slot 56 to uncover the slot in one of the races 50 and allows the first tack to slide forward so that its shank occupies the slot 56. A slotted extension 57 of the race 50 projects under the fingers 55 and a slotted plate 58 projects over said fingers for the purpose of supporting and guiding the tacks toward the bore 60 in the nipple-bar 20, which is open at this point for the reception of the tacks. A continued movement of the feeder 53 causes the beveled end of one of the fingers 55 to pick off the foremost tack and project said tack into the bore 60 of the nipple-bar 20.

The mechanism which actuates the feeder 53 comprises a "bell-crank lever" 70, fulcrumed at 71 to an ear projecting from the head 10. The lower arm of said lever is connected by a pin 72 to the feeder 53, and the other arm is connected by means of a link 73 to an adjustable stud 74 depending from the extension 24 of the nipple-bar 20. By reason of these connections any vertical reciprocation of the nipple-bar 20 causes a horizontal reciprocation of the feeder 53 across the ends of the tack-races 50. As previously stated, a gripping-lever 22 is mounted at the lower end of the nipple-bar 20, and is fulcrumed on a stud 61 passing through an ear on said nipple-bar. A link 62 connects the upper end of the lever 22 to one arm of a bell-crank lever 63 fulcrumed on a stud 64 on the head 10. The other arm of the lever 63 is connected by a thrust-rod 65 to a treadle (not shown) at the base of the standard 11.

A shoe to be lasted is presented to the tack-delivering nipple 21, so that the edge of the upper $a$ projects between said nipple and the lower end of the gripping lever 22, as shown in Fig. 16. The inner faces of said nipple and gripping lever are provided with teeth, as indicated at $x$ and $y$. A depression of the treadle already referred to causes the teeth $y$ to close on the edge of the upper $a$ which is held between the two rows of teeth $x$ and $y$. The shoe is then given a forward and upward rocking motion, which causes the innersole $b$ to bear against the rounded shoulder 220 of the lever 22, (see Fig. 17.) This affords a good purchase on the upper $a$ and pulls it well over the edge of the innersole $b$. By continuing the tension on the upper and at the same time rocking it back to the position shown in Fig. 1, the shoe is ready to receive a tack.

It will be remembered that the nipple-bar 20 may have a slight upward movement in its guides 23 23. By pressing the shoe upwardly, still retaining the necessary tension on the upper, the nipple-bar 20 and its extension 24 will be raised so that the link 73 and lever 70 will actuate the tack-feeder 53, thereby transferring a tack from one of the races 50 to the bore 60 of the nipple-bar 20, and at the same time the extension 24 will press upwardly the latch 30 which causes the lever 28 to withdraw the plunger 25 from the projection 26 which automatically clutches the pulley 14 to the shaft 12. Thus the driver is caused to descend on the tack already placed in the bore 60 of the nipple-bar 20 and drive said tack into the shoe. The latch 30 is so adjusted by the stop 33 that when the nipple-bar has reached its upper extreme, said latch, by reason of the stoppage of its arm 32 by said stop, rides off the end of the extension 24, and this allows the spring 27 to return the plunger 25 to its former position in the path of rotation of the projection 26. As the projection rotates, it engages the beveled face 250 of the plunger 25 and simultaneously unclutches the pulley 14 and arrests the rotation of the shaft 12 at the completion of one revolution. The shoe and nipple-bar 20 are then lowered, allowing the latch 30 to spring into place on the extension 24, the lever 22 is released, the shoe moved to another position, and the same operation repeated.

Figs. 5 and 6 show the left-hand tack-race in position to deliver tacks, and Figs. 7 and 8 show the right-hand race in position. The tack-races are fastened together at their lower ends by a tie-plate 66 and at their upper end by a plate 67 which is supported by a bracket 68 swiveled at 69 to the head 10. Said bracket has two upwardly projecting arms 75 75 which are provided with studs 76 76 on which are rotatively mounted the tack-pots or reservoirs 51. Inasmuch as the tack-races and reservoirs are all rigidly connected together, they swivel together when said races are shifted from one position to another. The lower ends of the tack-races are supported by adjusting screws 77, threaded in bosses projecting from the head. Figs. 1, 5 and 18 show a finger-lever 78 pivoted to one of said bosses. Said lever engages a pin 79 on one of the races 50 and as the lever 78 is rocked up or down, it shifts the races 50 one way or the other, so that either one race or the other will register with the nipple-bar 20. A spring 80 serves to hold the lever 78 in either of its two positions. The delivery ends of the races are far enough apart to allow the feeder 53 its full movement without uncovering the outlet of the race which does not register with the nipple-bar.

A description of one tack-reservoir will be sufficient since both reservoirs are identical. For the purpose of filling the tack-race with tacks, the tack-reservoir is provided with radial fins 81 on the inner face of its periphery. The tack-reservoir is rotated by reason of having on its periphery a gear which is driven by a pinion 120 on the rear end of the shaft 12. The fins 81, as they approach the top of the tack-pot or reservoir spill the tacks which they have brought up from the bottom of the reservoir onto the rear end of the race which extends into the reservoir. A stationary disk 82, through which the tack-race projects, serves to keep the front side of the tack-reservoir closed. Threaded into the tack-reservoir are screws 83 83, whose heads overlap the edge of the disk and thus keep it closed against a flange 84 around the opening of the tack-reservoir. A wiper 85 located above the tack-race in the tack-reservoir brushes over said race, each time one of the fins 81 has spilled its load of tacks onto the race, to remove the superfluous tacks and straighten those which drop into the slot of the race. This wiper is affixed to a stem 86 which projects through the front disk 82 and which is provided at its outer end with a finger 87. Said finger is normally held against a stop 89 by a spring 90. The upper end of the finger 87 lies in the path of rotation of a series of projections 88 on the tack-reservoir, and is rocked by them, as the tack-reservoir rotates.

Provision is made for driving the tacks to a greater or lesser depth in the shoe by a shifting mechanism in the block 19 on the driver-bar 1. Said driver-bar is connected to the block 19 by a sleeve 91 contained in the block and in which the driver-bar is held by collars 92 92 pinned to the driver-bar. A stud 93 which is affixed to the sleeve 91 projects through a slot 94 in the block 19 and into a cam-slot 95 of a sliding-plate 96. Said plate is held in the block 19 by gibs 97 97. By sliding the plate 96 to one end or the other in the block 19, its cam-slot 95 coacting with the stud 93, raises or lowers the sleeve 91 in relation to the block 19. Hence the range of throw of the driver-bar 1 is raised or lowered. In view of the fact that no jack is employed, a spring 98 on the driver-bar is interposed between the sleeve 91 and lower collar 92 to absorb the shock which the operator would otherwise receive from the blow delivered by the driver-bar, but at the same time is of sufficient strength to drive the tack.

From the foregoing description, it will be apparent that the tack-feeding mechanism and the tack-driving mechanism are independently actuated, and that both are controlled by the tack-nozzle or nipple, or by the pincers or gripper.

I do not herein claim the combination of the lasting and nailing mechanisms herein illustrated and described, since they form the subject-matter of my application Serial No. 190,932, filed January 28, 1904, of which this is a division.

Having thus explained the nature of the invention, and described a way of constructing and using the same, although without attempting to set forth all of the forms in which it may be made, or all of the modes of its use, I declare that what I claim is:

1. A machine of the character described, comprising a movable member with which the shoe may be brought into contact, automatic fastener-inserting mechanism, fastener-feeding mechanism, means in consequence of which said member actuates said fastener-feeding mechanism, and means in consequence of which said member controls said fastener-driving mechanism.

2. A machine of the character described comprising a movable member adapted to be moved by a shoe presented thereto, fastener-driving mechanism controlled by said member, and fastener-feeding mechanism actuated by said movable member.

3. A machine of the character described, comprising a tacking mechanism having a driver, and a movable nipple through which the tack is driven, in combination with a tack raceway, a tack-feeder, and direct connections between the tack-feeder and the nipple, whereby the movement of the nipple effects directly the feeding of a tack.

4. A machine of the character described, comprising a tack-race, a tack-feeding mechanism, a reciprocating tack-driver, a shaft connected to said tack-driver and having a continuously rotated clutch-pulley thereon, a clutch and stop mechanism for clutching said pulley to said shaft for one revolution thereof, and a movable tack-delivering nipple connected to said clutch-mechanism, and to said tack-feeding mechanism whereby, when said nipple is moved, it causes said feeding mechanism to transfer one tack from the race into the path of said driver, and simultaneously actuates the clutch and stop mechanism to clutch said pulley to said shaft for one revolution.

5. A machine of the character described, comprising a tack-driver, a raceway, a nipple for the tacks and through which the driver is adapted to reciprocate, a tack-feeder for transferring tacks from the raceway to the nipple, a guide in which said nipple is longituridinally movable, and a connection between the nipple and the tack-feeder in consequence of which the nipple actuates the tack-feeder to present a tack to the action of the driver.

6. In a tacking machine, the combination with a tack-race, a tack-feeding mechanism, and a tack-driver bar, of a rotary shaft having a crank thereon, a grooved block on the driver-bar, and a freely operative member connecting said block and driver-bar adapted to be manually actuated for longitudinally shifting the said driver-bar relative to said block to vary the range of reciprocation of said bar and thereby drive a tack a greater or less distance in the shoe.

7. A machine of the character described comprising a tack-driver, a tack-receiving member, inclined tack-races whose lower ends are adjacent and adapted to be moved laterally so that either may register with and deliver to said receiving member, and a reciprocatory tack-feeding member movable transversely across the ends of the races and adapted to select and transfer tacks one at a time from either race registering with the receiving member and at the same time to cover the outlet of the other race.

8. A machine of the character described comprising a member having a throat and a laterally extending passage way for the introduction of a tack, a driver movable through said throat, a pair of inclined tack races adapted to be shifted laterally so that either may register with said passage way, a reciprocatory member movable transversely of said races, and a pair of complemental fingers carried by said member, said fingers extending toward each other and being arranged so that one may feed tacks one by one into said passage way from either registering race, and so that they may act respectively, one with either race, to close the outlet of the race which does not register.

In testimony whereof I have affixed my signature, in presence of two witnesses.

HARRIE A. BALLARD.

Witnesses:
M. B. MAY,
C. C. STECHER.